United States Patent [19]

Sternenberg et al.

[11] 4,241,895
[45] Dec. 30, 1980

[54] ANNULAR RESILIENT METAL VALVE SEAT

[75] Inventors: James E. Sternenberg; William W. Broadway, both of Houston, Tex.

[73] Assignee: FMC Corporation, San Jose, Calif.

[21] Appl. No.: 899,930

[22] Filed: Apr. 26, 1978

[51] Int. Cl.³ .............................................. F16K 1/22
[52] U.S. Cl. ................... 251/173; 251/174; 251/306; 251/361; 251/363
[58] Field of Search ............... 251/173, 174, 306, 317, 251/361, 363

[56] References Cited

U.S. PATENT DOCUMENTS

| | | | |
|---|---|---|---|
| 2,816,729 | 12/1957 | Jensen | 251/75 |
| 2,893,682 | 7/1959 | Hintzman et al. | 251/173 |
| 2,911,184 | 11/1959 | Moore | 251/173 |
| 3,056,576 | 10/1962 | Kulisek | 251/175 |
| 3,077,331 | 2/1963 | Burtis | 251/173 |
| 3,077,332 | 2/1963 | Burtis | 251/173 |
| 3,127,182 | 3/1964 | Wardleigh | 277/26 |
| 3,153,427 | 10/1964 | Burtis | 137/527 |
| 3,156,445 | 11/1964 | Swain | 251/171 |
| 3,185,436 | 5/1965 | Rovang et al. | 251/172 |
| 3,260,502 | 7/1966 | Plumer | 251/306 |
| 3,273,855 | 9/1966 | Wells | 251/328 |
| 3,282,555 | 11/1966 | Mallonee | 251/306 |
| 3,394,915 | 7/1968 | Gachot | 251/174 |
| 3,528,448 | 9/1970 | Urban | 137/242 |
| 3,550,905 | 12/1970 | Sifford | 251/306 |
| 3,550,906 | 12/1970 | Mayers | 251/306 |
| 3,563,510 | 2/1971 | Priese | 251/173 |
| 3,580,541 | 5/1971 | Bouhot | 251/317 |
| 3,591,133 | 7/1971 | Miles | 251/173 |
| 3,608,861 | 9/1971 | Helman et al. | 251/173 |
| 3,642,248 | 2/1972 | Benware | 251/174 |
| 3,650,508 | 3/1972 | Koslama et al. | 251/174 |
| 3,666,236 | 5/1972 | Gachot | 251/306 |
| 3,834,663 | 9/1974 | Donnelly | 251/173 |
| 3,997,142 | 12/1976 | Broadway | 251/307 |

FOREIGN PATENT DOCUMENTS

| | | | |
|---|---|---|---|
| 2454452 | 7/1975 | Fed. Rep. of Germany | 251/306 |
| 2320482 | 8/1975 | France | 251/306 |
| 2331725 | 11/1975 | France | 251/306 |

Primary Examiner—William R. Cline
Assistant Examiner—H. Jay Spiegel
Attorney, Agent, or Firm—L. B. Guernsey; W. W. Ritt, Jr.

[57] ABSTRACT

An annular valve seat having a resilient metal seal for use in a variety of types of valves provides positive control of fluid flow, with effective metal-to-metal sealing, long life and easy replacement of the seal. The metal seal is in the form of an annular ring comprising approximately one-quarter of a torus that cooperates with the valve's flow control element to establish a metal-to-metal fluid seal which is especially useful at relatively high temperatures. A first edge portion of the torus is held in position against a radial surface of the valve's body by a retainer ring which centers the torus about the flow control element. When the valve is closed the flow control element presses against the outside portion of the resilient metal torus forcing the free edge of the torus against a portion of the retainer ring so that the seal is loaded as a structural span supported at the ends by the valve's body and the retainer ring. The flow control element presses against the central portion of the span which deflects into a concave form to press tightly against the flow control element to effect a fluid-tight seal. The retainer ring and the torus are held in position in the valve body by a plurality of screws so that the ring and torus may be quickly and easily removed for servicing or for replacement.

7 Claims, 6 Drawing Figures

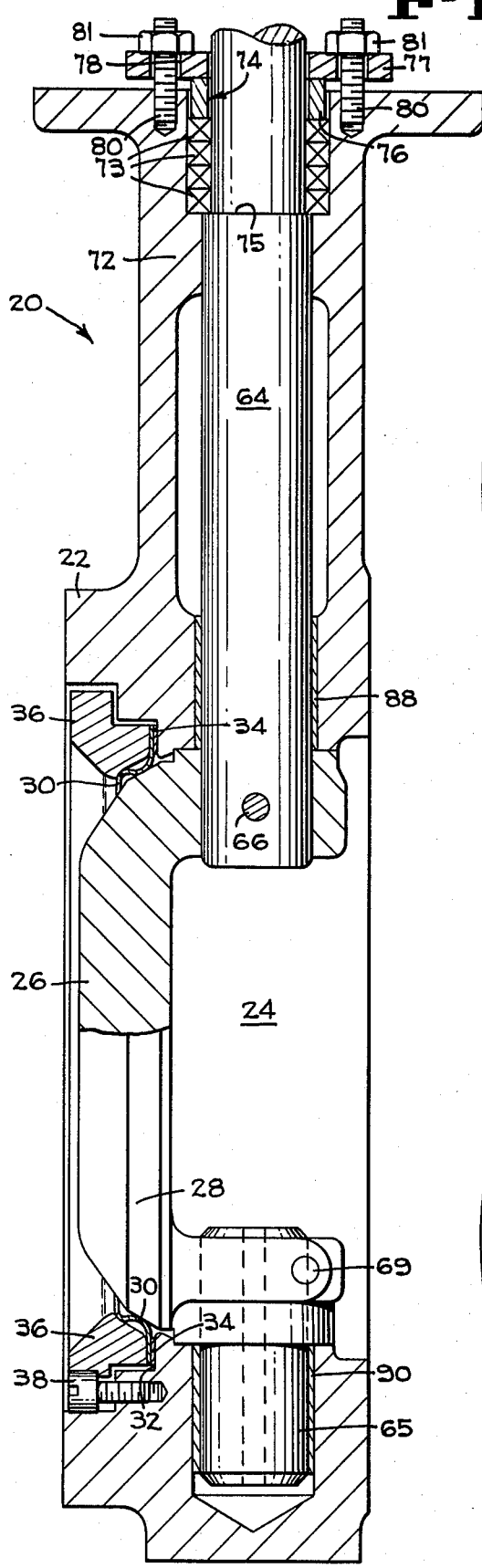
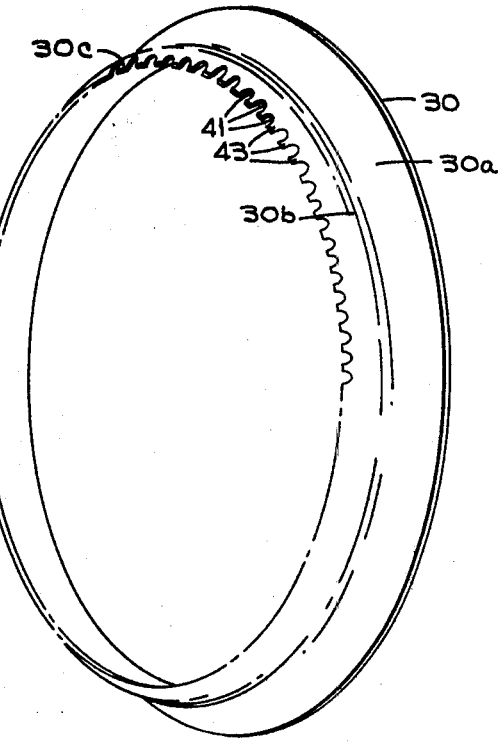
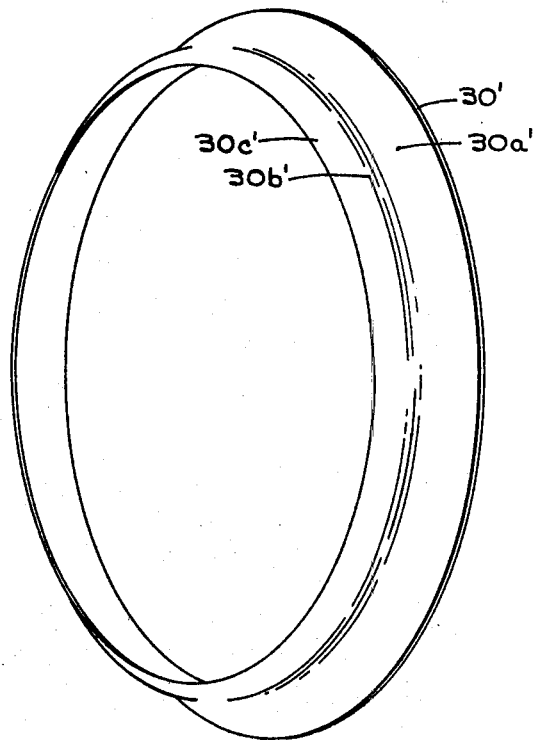

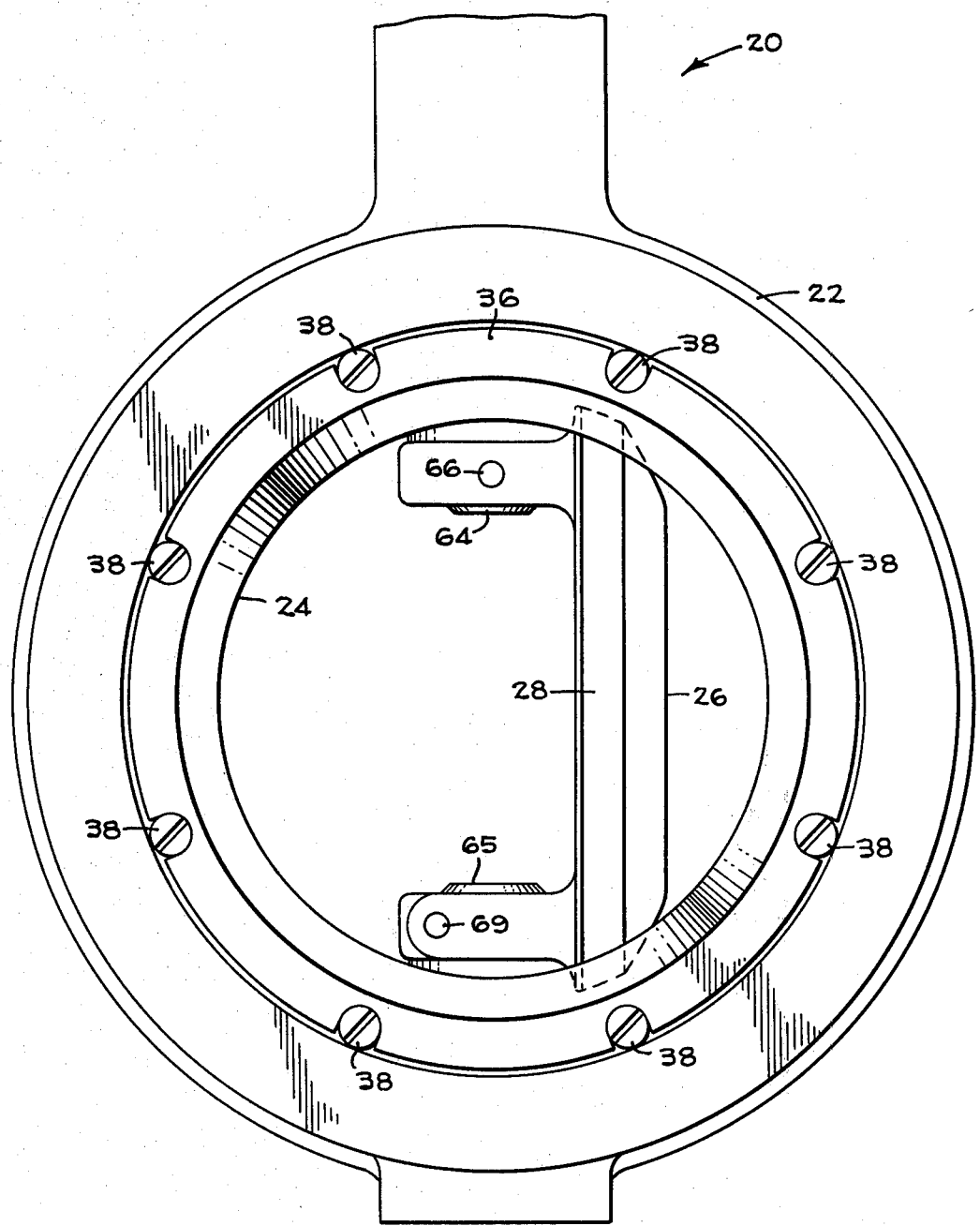
FIG_2

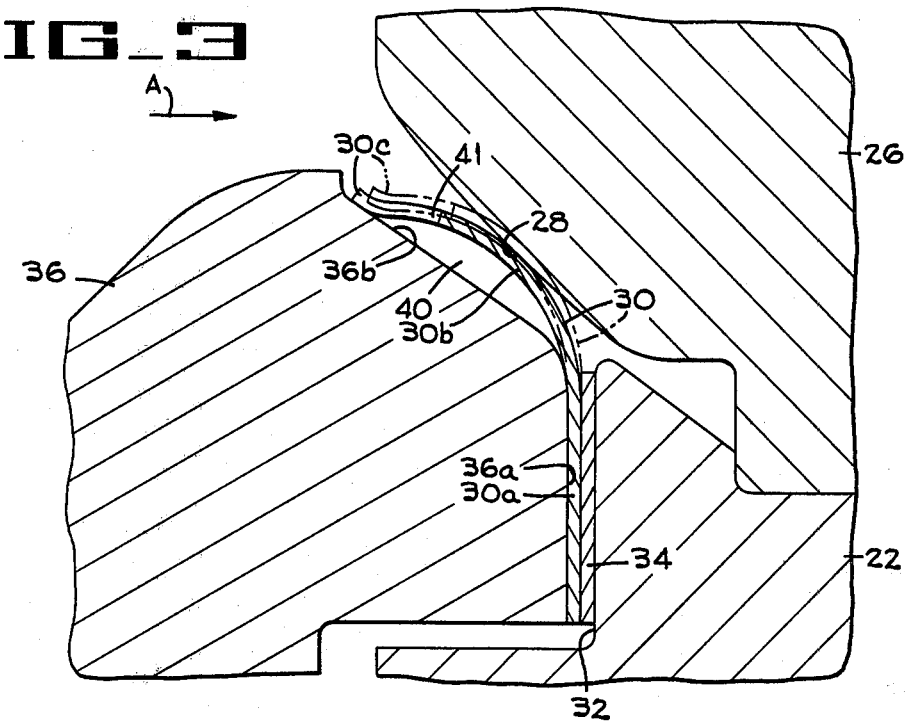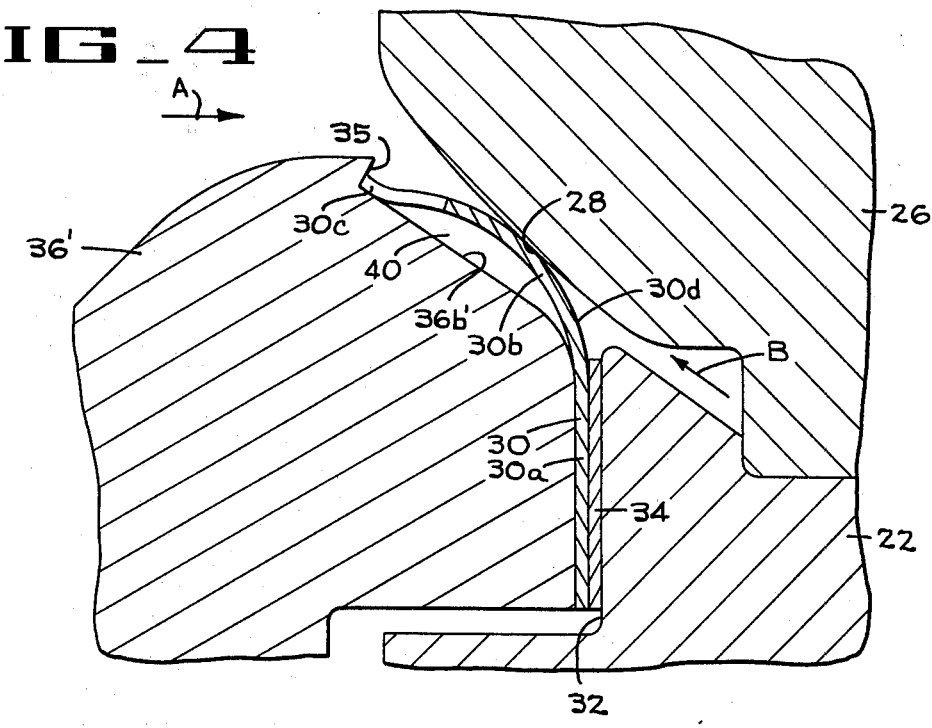

ANNULAR RESILIENT METAL VALVE SEAT

BACKGROUND OF THE INVENTION

1. Field of the Invention

This invention relates to fluid control valves, and more particularly, to an annular metal seat for use with control valves used at relatively high temperatures.

2. Description of the Prior Art

Butterfly and other types of fluid control valves with annular resilient seals are well known and commonly used for controlling the flow of various fluids at ambient or moderate temperatures and modest pressures in a wide variety of industries. However, the materials which are used in the seals of these valves tend to flow or creep when the temperature is raised, causing the valves to leak and to be unsatisfactory for high temperature use.

There have been attempts to design and build valves having a cantilever type of resilient metal seals for use at temperatures up to 1000 degrees F., but in general these valves require precision machining of the seal and other parts of the valve which causes the valve to be quite expensive. When the valve is closed, the cantilever type of metal seal yields an amount which is determined by the stress applied by a flow control element which presses against the seal so the cantilever seal does not return to the original configuration. In addition, the cantilever type of metal seal reaches the maximum safe working stress of the seal material at a relatively low value of applied load. The low applied load permissible with the cantilever type of metal seal limits the force which can be transmitted between the seal and the flow control element to a value less than that required for optimum sealing. As a result, after they have been opened and closed a few times these expensive valves develop a relatively high rate of leakage which makes them somewhat less than satisfactory for many industrial applications. Other prior art high temperature valves use an annular ring type of metal valve seal which is loaded by the flow control element to produce a hoop stress in the ring. This ring type of metal seal also requires expensive precision machining of the seal. The hoop loaded ring type of valve seal is also affected by the stress of deforming the seal and has a relatively high rate of leakage.

What is desired is a fluid-control valve having a resilient metal valve seat that maintains a fluid-tight contact with the valve body and with the flow control element over a wide range of temperatures up to approximately 1000° F. The valve seat should continue to maintain the same fluid-tight contact with the flow control element after the valve has been opened and closed many times. It is also desirable to provide a valve that is relatively simple and inexpensive to build, and having an inexpensive, easily-replaceable metal seal.

SUMMARY OF THE INVENTION

The present invention comprises a butterfly or other type of valve with a flexible annular metal seal of novel configuration, and a rigid retainer ring that cooperates in a unique manner with the metal seal to maintain the seat in a fluid-tight contact with the flow control element and the valve body through a wide temperature and pressure range.

The preferred embodiment of the valve seal of the present invention functions to prevent fluid flow in either direction through the valve, and has a cross-sectional shape somewhat like a quarter of a torus, with one edge of the torus held in position against a radial surface of the valve body by a retainer ring with the seal mounted as a cantilever. When the flow control element is closed it presses against the curved portion of the torus and moves the free edges of the torus against the surface of the retaining ring until the seal operates in the mode of a structural span. The seal operates in the cantilever mode as the flow control element is being closed, and operates in the structural span mode after the flow control element is closed. The force which can be transmitted by the seal while in the structural span mode is several times greater than the force which can be transmitted by the seal while in the cantilever mode. In the cantilever mode the seal adjusts to any differences in manufacturing tolerances between it and the flow control element so that the seal can be manufactured easily and inexpensively by stamping or spinning from sheet metal. The seal then provides an exceptionally good fluid seal while operating in the structural span mode.

A plurality of slots may be located along the free edge of the torus to readily allow fluid under pressure from a first side of the valve to enter a space between the torus and the retainer ring so that the fluid forces the curved portion of the torus tightly against the valve control element. As the fluid pressure increases, the torus is forced more tightly against the valve control element to provide a high pressure seal. When fluid under pressure is admitted from a second side of the valve, the fluid pressure causes a deflection in the curved portion of the torus thereby pressing the free edge of the torus against a lip on the retainer ring. This causes the torus to bend toward and press more tightly against the flow control element.

Since a butterfly valve is not a balanced valve, the static pressure drop across its surface and the impact of the fluid during flow produces a thrust load on the flow control element or disc that tends to carry the disc down the stream. Tests have shown that this thrust load is not evenly distributed across the disc except at the fully open or the fully closed positions. At all intermediate positions, the thrust load on the wing of the disc turned toward the upstream side of the valve is greater that that on the downstream wing. To minimize this thrust load problem, the disc shafts of butterfly valves according to the present invention are offset from the fluid flow passage axis, thereby permitting the short wing of the disc to enter the fluid flow first when the valve is installed so that the fluid flow is in the intended direction. Furthermore, the disc shaft is also displaced axially from the valve seat so that the valve seat establishes an unbroken annular seal interface with the disc. This feature permits equal sealing forces to be exerted around the entire circumference of the disc, with a result that all points along the circumference, including those in the shaft area, lift away from the seat when the valve is open, and contact the seat when the valve is closed. Thus, there is no pivoting or twisting action exerted against the valve seal, and the valve therefore can be opened and closed with very little, if any, scuffing of the seal, and with significantly less torque than would be otherwise needed.

Because damage to the annular seal could result if the valve flow control element were rotated 360° about its shaft axis, the valves according to the present invention are also provided with mechanical stops to prevent over-travel of the flow control element from the fully closed to the fully opened position. Furthermore, a stop system for the fully closed position, comprising surfaces on the flow control element and the valve body, is preferably included in valves of this invention to prevent over-rotation of the flow control element past the exact position where ideal sealing is achieved.

Butterfly valves are frequently used for throttling service, i.e., wherein the valve is employed to reduce downstream pressure to some fraction of the prevailing upstream pressure, but is not fully closed to completely shut off flow therethrough. Since the configuration of the seal of this invention would subject it to highly erosive forces when fluid is throttled through the valve, the invention includes the provision of an annular shoulder or lip on the retaining ring that projects inwardly into the flow chamber through the valve in front of the seal. This shoulder or lip causes the fluid flow to arch over the seal, and thus protects the seal from direct high-velocity impingement.

BRIEF DESCRIPTION OF THE DRAWINGS

FIG. 1 is a central vertical section of a butterfly valve embodying the features of the present invention.

FIG. 2 is a partial end elevation of the valve of FIG. 1 in the fully opened position.

FIG. 3 is an enlarged fragmentary section of the disc, the body, the seal, and one embodiment of the retainer ring of the valve of FIGS. 1 and 2 illustrating the relationship of the elements when the valve is closed.

FIG. 4 is a view like FIG. 3 illustrating the relationship of the elements of FIG. 3 with a second embodiment of the retainer ring.

FIG. 5 is an isometric view of the metal seal showing the slots around the portion of the free edge of the torus.

FIG. 6 is an isometric view of another embodiment of the metal seal without the slots of FIG. 5.

DESCRIPTION OF THE PREFERRED EMBODIMENTS

As illustrated in FIGS. 1 and 2, a butterfly valve 20, incorporating the features of the present invention with a bi-directional metal seal for controlling the fluid flow in either direction, includes a generally annular body 22 defining a fluid flow passage 24, the illustrated body being adapted for insertion between opposed standard pipe flanges (not shown). Rotatably supported in the flow chamber 24 is a fluid control disc 26 with a circumferential sealing surface 28, the surface 28 preferably having a spherical configuration. The disc sealing surface 28 is adapted to cooperate with an annular bi-directional valve seal 30 that is preferably formed from a stiff but flexible metallic material, such as Inconel X-750 or the like, which has been heat treated for strength and relaxation resistance at high temperatures. The seal 30 (FIGS. 1, 3, 4 and 5) resides in an annular seat chamber 32 formed by a counterbore in the valve body 22, and having a seat gasket 34 positioned between the chamber 32 and the seal 30. The seal and the gasket are retained in the seat chamber 32 by a retainer ring 36 that is releasably secured to the above body 22 by cap screws 38 or other suitable means, the cap screws applying a sufficient axial load on the retainer ring 36 to effect a fluid seal on the seal and the valve body, and also facilitating quick and easy installation or removal of the seal without necessitating removal of the disc 26 or otherwise disassembly of the valve. When the seal 30 is being installed, the valve should be in its illustrated fully closed position since the seal is free-floating and thus will center itself diametrically against the disc 26 and thus establish a complete, unbroken sealing interface with the disc spherical surface 28.

The seal 30 is formed of a planar portion 30a (FIGS. 3 and 4) and a lip or curved portion 30b in the form a quarter torus. The planar portion 30a is clamped in a fluid-tight arrangement between an inner surface 36a of the retainer ring 36 and the seat gasket 34. A free edge portion 30c is curved outwardly from the retaining ring 36 with the free edge portion 30c positioned a slight distance from the retainer ring (as seen in the phantom lines of FIG. 3), when the fluid control disc is in the open position. As the fluid control disc moves into the closed position (FIG. 3) the lip 30b contacts the sealing surface 28 of the fluid control disc 26, causing the free edge portion 30c of the lip to press against a frusto-conical inner surface 36b of the retainer ring 36. The pressure of the sealing surface 28 causes the lip 30b to deflect in the form of a structural span which is fixed (FIG. 3) at one end and supported at the other end, thereby providing pressure against the disc sealing surface 28 and developing a fluid-tight seal between the lip 30b and the disc 26.

When the closed valve is subjected to fluid under pressure on the left side of the disc, as indicated by the arrow A (FIG. 3), fluid is forced into a chamber 40 between the lip 30b and the frusto-conical surface 36b of the retainer ring 36 to exert a pressure which forces the lip 30b more tightly against the sealing surface 28. A plurality of slots 41 (FIGS. 3 and 5) facilitates the movement of fluid into the chamber 40, although sufficient pressure can develop in the chamber 40 without these slots as the edge 30c (FIGS. 3 and 6) of the lip is not a perfect seal. A plurality of spaced leaf sections 43 (FIG. 5) are formed between the slots 41 with each of the leaf sections acting as an individual spring which rests against the frusto-conical surface 36b and transmits a radially inward force to the lip 30b. The number of spaced leaf sections may be varied from zero to any convenient number as required to transmit the total radial force needed for optimum sealing.

Another embodiment of the annular valve seal 30' having a generally solid edge 30c', without any slots, is disclosed in FIG. 6. The edge 30c' is not a perfect seal so that fluid can move into the chamber 40 (FIGS. 3 and 4) between the lip 30b' and the frusto-conical surface 36b of the retainer ring 36 when the seal 30' is substituted for the seal 30 of FIGS. 3 and 4.

FIG. 4 discloses another embodiment of the annular metal seal having means for utilizing fluid pressure to enhance the sealing properties of the valve when fluid under pressure is applied in either direction. The retainer ring 36' includes a shoulder 35 at the radially inward end of the frusto-conical surface 36b'. The shoulder 35 restricts the axial movement of the free edge 30c of the seal 30 along the surface 36b'. When the closed valve is subjected to fluid pressure on the right side of the disc as indicated by the arrow B (FIG. 4), fluid presses against the portion 30d of the seal and tends to deform this curved section outwardly into a straight line. This deformation forces the portion 30b of the seal radially inward to enhance the seal load between the seal 30 and the disc 26.

When the closed valve of FIG. 4 is subjected to pressure on the left side of the disc as indicated by the arrow A, fluid is forced into the chamber 40 to enhance the seal load between the seal 30 and the disc 26 as discussed hereinbefore in connection with the embodiment shown in FIG. 3. Thus, fluid pressure in either direction enhances the sealing of the valve disclosed in FIG. 4.

In order to minimize the resistance to fluid flow through the valve 20, a two-piece valve shaft (FIG. 1) comprising upper elements 64 and lower elements 65 is employed with the disc 26. The upper shaft element 64 is secured to the disc 26 by a pin 66 which is secured in place by an interference fit with both the upper shaft 64 and the disc 26, while the lower shaft element 65 is secured to the disc 26 by means of a roll pin 69 in the well-known manner. The space between the upper shaft 64 and the bonnet portion 72 of the valve body is sealed by a plurality of packing rings 73. The packing rings 73 are squeezed between a shoulder 75 on the valve body and a packing follower 74 to force the rings 73 tightly against the shaft 64. The packing follower includes an annular metal ring 76 and a cover plate 77 having a plurality of holes 78. A plurality of bolts 80 and nuts 81 secure the cover plate 77 to the upper end of the bonnet portion of the valve and cause the cover plate 77 to press the metal ring 76 against the packing rings 73.

The upper and lower shaft elements 64, 65 are supported in the valve body by upper and lower sleeve type bearings 88, 90, respectively, which bearings can be constructed of a non-galling material with a low coefficient of friction and capable of withstanding exposure to high temperature fluids. A material such as graphite or Tribaloy can be used. Thus, any torque created by the valve actuating mechanism is transmitted to the upper shaft 64, to the disc 26, and subsequently to the lower shaft element 65, assuring that both shaft elements and the disc rotate in unison as a valve is opened or closed. Furthermore, no matter in which direction fluid pressure is applied to the disc 26, the shaft bearings 88, 90 fully support the pressure load, thereby assuring no pressure loading of the seal 30 by the disc 26.

The present invention provides a metal-to-metal seat having extremely low fluid leakage because of the combination of using the seal in both the cantilever mode and in the structural span mode of operation. The seal is secured by one edge and operates in the cantilever mode while the flow control element is being closed thereby allowing for tolerances in manufacture. The free edge of the seal then moves against a supporting retainer ring so that the seal operates in the structural span mode when the flow control element is completely closed.

Although the present invention has been described as embodied in a butterfly valve, it should be understood that the invention can be utilized in other types of valves, and therefore is not restricted in application to the foregoing constructions.

Although the best mode contemplated for carrying out the present invention has been herein shown and described, it will be apparent that modification and variation may be made without departing from what is regarded to be the subject matter of the invention.

What is claimed is:

1. A valve comprising, in combination, a generally annular valve body defining a flow passage;
   a fluid flow control element movably supported in the flow passage for controlling the flow of fluids through the valve;
   an annular resilient metal seal having a planar portion and a curved lip portion, said lip portion having a shallow arcuate configuration and extending generally laterally from said planar portion entirely to one side of the plane defined thereby with the free edge of said lip portion defining the laterally outermost extent of said lip portion spaced from said planar portion, said seal being positioned in the flow passage where said lip portion cooperates with the flow control element to establish a fluid flow barrier through said passage;
   a retainer ring having a planar portion and a frusto-conical portion, said retainer ring being positioned in the flow passage such that said planar portion of said seal is gripped in a fluid-tight relationship between said planar portion of said retainer ring and said frusto-conical portion is in normally spaced relation to said seal lip portion, whereby portions of said valve body operate said seal in a cantilever mode as said flow control element moves against said seal, said frusto-conical portion of said retainer ring supporting the free edge of said lip portion of said metal seal when said control element presses against said lip portion of said metal seal to operate said seal in a structural span mode when said passage is closed; and
   means for releasably securing said retainer ring in position against said metal seal.

2. A valve as defined in claim 1 wherein said lip portion of said seal comprises a flexible metal ring having the form of a portion of a torus.

3. A valve as defined in claim 1 including a gasket positioned between said valve body and said planar portion of said seal to provide a fluid-tight seal therebetween.

4. A valve as defined in claim 1 wherein said flow control element includes a generally spherical sealing surface which cooperates with said lip portion of said metal seal to provide a fluid-tight flow barrier.

5. A valve as defined in claim 1 including at least one slot formed in the free edge of the lip portion of said seal to facilitate the movement of fluid into the area between said lip portion of said seal and said frusto-conical portion of said retainer ring.

6. A valve as defined in claim 1 including means for limiting the axial movement of said free edge of said lip portion of said metal seal when said control element presses against said lip portion of said metal seal.

7. A valve as defined in claim 6 wherein said means is an abutment shoulder adjacent said ring frusto-conical portion.

* * * * *